US006993665B2

(12) United States Patent
Heddings et al.

(10) Patent No.: US 6,993,665 B2
(45) Date of Patent: Jan. 31, 2006

(54) APPLET PERMISSIONS MANAGER

(75) Inventors: Jason A. Heddings, Erie, CO (US);
Chad A. Schoettger, Louisville, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 415 days.

(21) Appl. No.: 10/138,137

(22) Filed: May 1, 2002

(65) Prior Publication Data

US 2003/0208636 A1   Nov. 6, 2003

(51) Int. Cl.
   *G06F 12/14*   (2006.01)
(52) U.S. Cl. .................. 713/200; 717/118; 719/320
(58) Field of Classification Search ........ 719/310–320;
   713/200–202, 166; 709/223, 204, 229; 718/1;
   717/118, 147–148
   See application file for complete search history.

(56) References Cited

U.S. PATENT DOCUMENTS

| | | | | |
|---|---|---|---|---|
| 6,047,377 | A  * | 4/2000 | Gong .......................... | 713/201 |
| 6,105,063 | A  * | 8/2000 | Hayes, Jr. .................... | 709/223 |
| 6,212,640 | B1 * | 4/2001 | Abdelnur et al. ........... | 713/201 |
| 6,339,826 | B2 * | 1/2002 | Hayes et al. ................ | 713/166 |
| 6,526,513 | B1 * | 2/2003 | Shrader et al. ............. | 713/200 |
| 6,708,276 | B1 * | 3/2004 | Yarsa et al. ................. | 713/201 |
| 6,839,735 | B2 * | 1/2005 | Wong et al. ................ | 709/204 |
| 2001/0042126 | A1 * | 11/2001 | Wong et al. ................ | 709/229 |
| 2003/0084324 | A1 * | 5/2003 | Koved et al. ............... | 713/200 |
| 2003/0084325 | A1 * | 5/2003 | Koved et al. ............... | 713/200 |

OTHER PUBLICATIONS

Advanced Distributed Learning, Sharable Content Object Reference Model (SCORM tm), Version 1.2 "The SCORM Content Aggregation Model", Oct. 1, 2001© 2001, pp. 180.
Advanced Distributed Learning, Sharable Content Object Reference Model (SCORM tm), Version 1.2 "The SCORM Addendums", Nov. 9, 2001, © 2001.
Advanced Distributed Learning, Sharable Content Object Reference Model (SCORM tm), Version 1.2 "The SCORM Run-Time Environment", Oct. 1, 2001, © 2001.
Advanced Distributed Learning, Sharable Content Object Reference Model (SCORM tm), Version 1.2 "The SCORM Overview", Oct. 1, 2001, © 2001.

* cited by examiner

*Primary Examiner*—St. John Courtenay, III
(74) *Attorney, Agent, or Firm*—Blakely, Sokoloff, Taylor & Zafman LLP

(57) ABSTRACT

Disclosed are novel methods and apparatus for providing a permissions manager capable of assisting an applet, for example, in determination and/or grant of the permissions required for an operation. In an embodiment, an apparatus for managing permissions is disclosed. The apparatus includes a software application, a permissions manager coupled to the software application and receiving a request sent by the software application, and a programming environment coupled to the permissions manager. The request may indicate a permission, which may be requested by the permissions manager. The permissions manager may access the programming environment to determine a required permission corresponding to the permission and to determine how to grant the required permission.

26 Claims, 3 Drawing Sheets

APPLET PERMISSIONS MANAGER

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawings hereto: Copyright© 2002, Sun Microsystems, Inc., All Rights Reserved.

FIELD OF INVENTION

The present invention generally relates to the field of applets. More specifically, an embodiment of the present invention provides an applet permissions manager to assist in determination and/or grant of the permissions required for an operation.

BACKGROUND OF INVENTION

As computers become more commonplace in everyday life, so do the demands on the functionality they provide. As such, computer programs are increasingly growing in size resulting in program bloat, data corruption, and "spaghetti" code. A very popular solution to these problems is provided through applets. An applet is generally a small part of an application that can be distributed economically. For example, an applet may display a document on a computer screen, spell-check a document, or play a sound file. Programs written in the Java language are often organized into applets. Applets can be interpreted at run-time, in part, because of their relatively small size.

When developing applets (in Java for example) which requires special permissions such as reading or writing from the client's hard drive, it is necessary to make special requests to a browser's proprietary security application programming interface (API). Different types and brands of browsers often require different requests and use different names for the types of permissions included with the requests.

In addition to different interfaces, browsers generally require that the request for the privilege and the actual use of that privilege be made on the current call stack. For example, a Java method which reads from a client's hard drive needs also be the method which makes the request for the permission from the browser. In many instances, the Java classes that run as part of an applet in a browser may also need to run in other environments (e.g., stand-alone and as part of a Java servlet on a web server). Since the browser APIs may not exist in these environments, classes which use them may not compile correctly. Furthermore, there may be no need to use these APIs in any case. Accordingly, the present solutions pose a number of shortcomings, which hinder the efficient growth and/or utilization of implementations utilizing applet-type solutions.

SUMMARY OF INVENTION

The present invention, which may be implemented utilizing a general-purpose digital computer, in some embodiments, includes novel methods and apparatus to provide a permissions manager capable of assisting an applet in determination and/or grant of the permissions required for an operation. In an embodiment, an apparatus for managing permissions is disclosed. The apparatus includes a software application, a permissions manager coupled to the software application and receiving a request sent by the software application, and a programming environment coupled to the permissions manager. The request may indicate a permission, which may be requested by the permissions manager. The permissions manager may access the programming environment to determine a required permission corresponding to the permission and to determine how to grant the required permission.

In another embodiment, a method of managing permissions is disclosed. The method includes: receiving a request from a software application, the request indicating a permission; requesting the permission; accessing a programming environment to determine a required permission corresponding to the permission; accessing the programming environment to determine how to grant the required permission; and granting the required permission.

BRIEF DESCRIPTION OF DRAWINGS

The present invention may be better understood and its numerous objects, features, and advantages made apparent to those skilled in the art by reference to the accompanying drawings in which.

The use of the same reference symbols in different drawings indicates similar or identical items.

DETAILED DESCRIPTION

In the following description, numerous details are set forth. It will be apparent, however, to one skilled in the art that embodiments of the invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

In addition, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, optical disks, compact disc-read only memories (CD-ROMs), and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data.

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Figure 1:
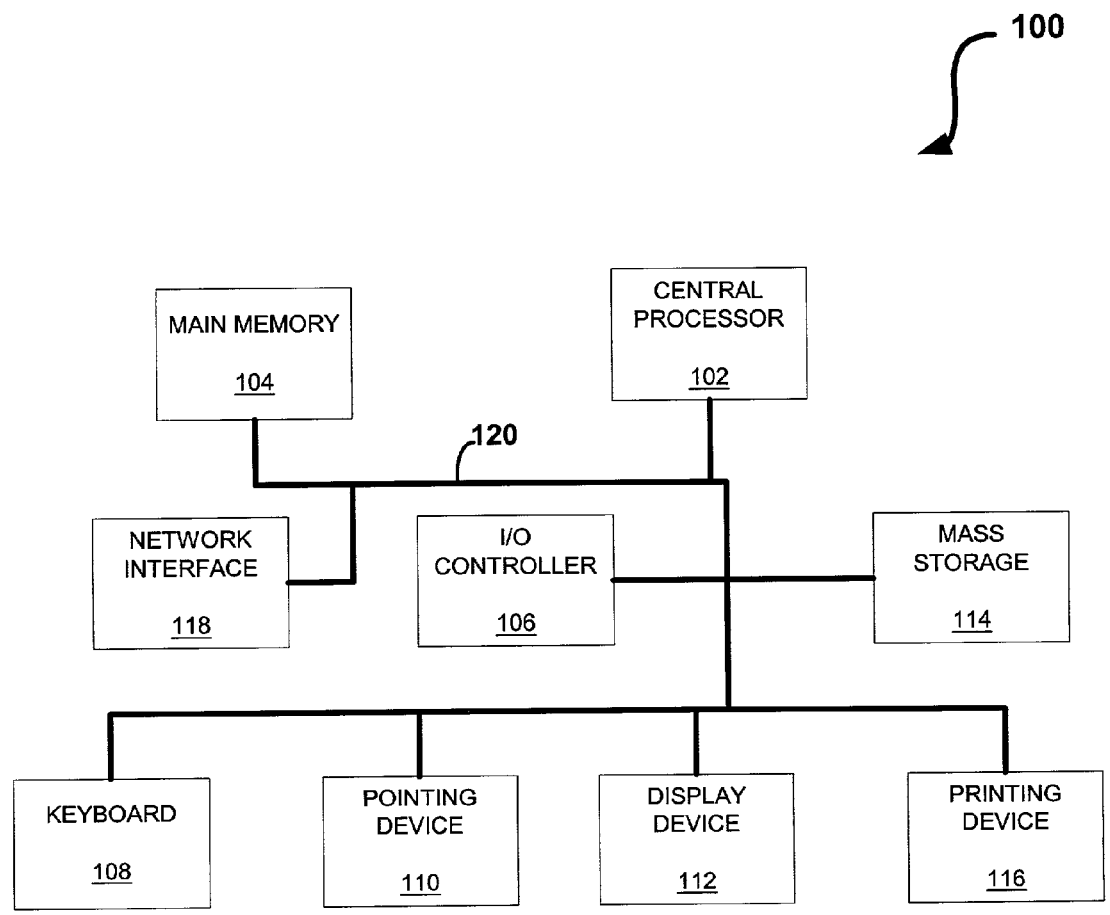
FIG. 1 illustrates an exemplary computer system 100 in which the present invention may be embodied.

FIG. 1 illustrates an exemplary computer system 100 in which the present invention may be embodied in certain embodiments. The system 100 comprises a central processor 102, a main memory 104, an input/output (I/O) controller 106, a keyboard 108, a pointing device 110 (e.g., mouse, track ball, pen device, or the like), a display device 112, a mass storage 114 (e.g., a nonvolatile storage such as a hard disk, an optical drive, and the like), and a network interface 118. Additional input/output devices, such as a printing device 116, may be included in the system 100 as desired. As illustrated, the various components of the system 100 communicate through a system bus 120 or similar architecture.

In an embodiment, the computer system 100 includes a Sun Microsystems computer utilizing a SPARC microprocessor available from several vendors (including Sun Microsystems of Palo Alto, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.). In addition, instead of a single processor, two or more processors (whether on a single chip or on separate chips) can be utilized to provide speedup in operations. It is further envisioned that the processor 102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 118 provides communication capability with other computer systems on a same local network, on a different network connected via modems and the like to the present network, or to other computers across the Internet. In various embodiments, the network interface 118 can be implemented utilizing technologies including, but not limited to, Ethernet, Fast Ethernet, wide-area network (WAN), leased line (such as T1, T3, optical carrier 3 (OC3), and the like), analog modem, digital subscriber line (DSL and its varieties such as high bit-rate DSL (RDSL), integrated services digital network DSL (IDSL), and the like), cellular, time division multiplexing (TDM), universal serial bus (USB and its varieties such as USB II), asynchronous transfer mode (ATM), satellite, cable modem, and/or FireWire.

Moreover, the computer system 100 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), and the like. Also, it is envisioned that in certain embodiments, the computer system 100 is a general purpose computer capable of running any number of applications such as those available from companies including Oracle, Siebel, Unisys, Microsoft, and the like.

Figure 2:
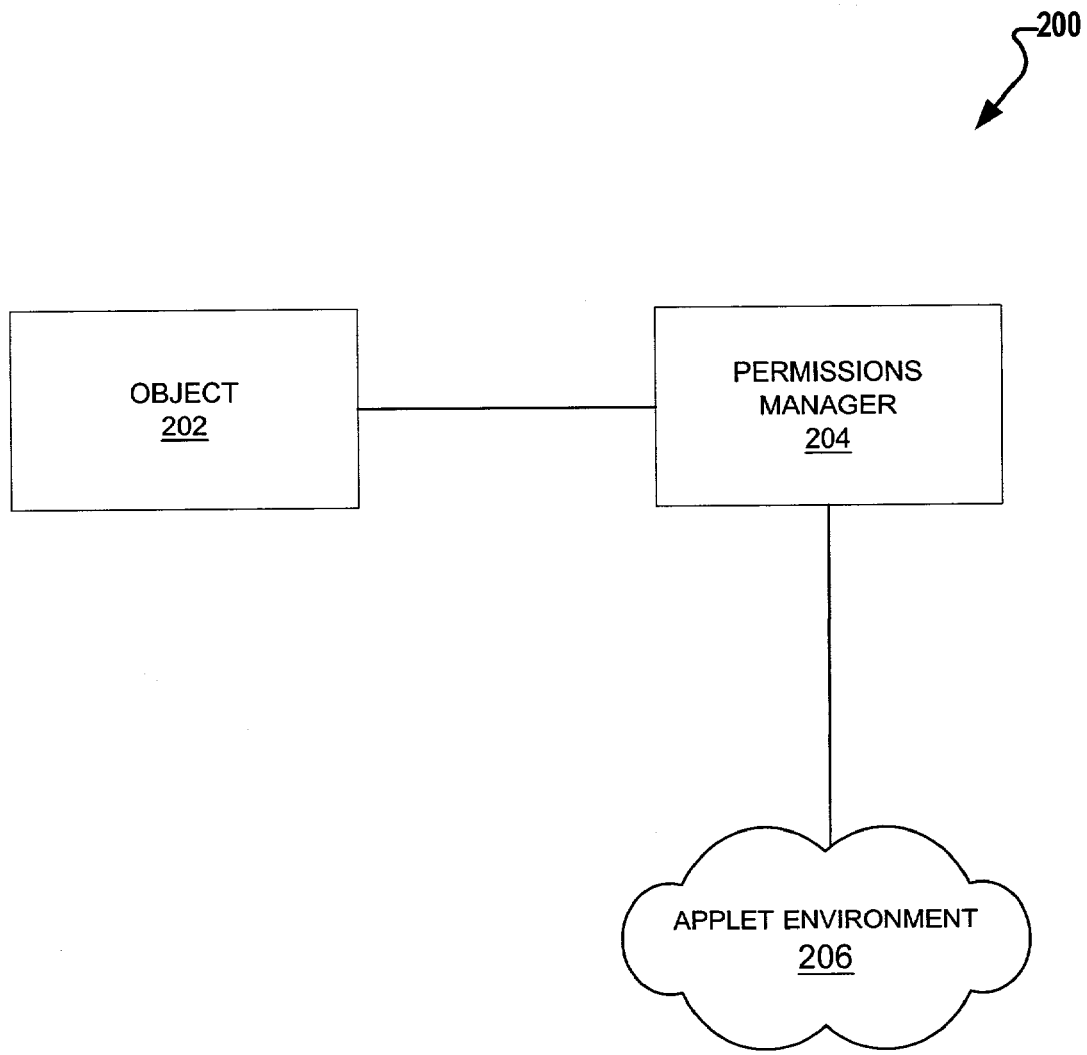
FIG. 2 illustrates an exemplarily block diagram of a system 200 in accordance with an embodiment of the present invention.

FIG. 2 illustrates an exemplarily block diagram of a system 200 in accordance with an embodiment of the present invention. The system 200 includes an object 202 which is coupled to a permissions manager 204. The object may be an applet, an object, a program, a procedure, a servlet, and the like in various embodiments. The object 202 may request a special access permission from the permissions manager 204. In an embodiment, the requested permission may be ultimately granted by a user. The request for the permission may be made through, for example, a signed applet (which may be different for each given browser). In an embodiment, the browser may be the Internet Explorer available from Microsoft Corporation of Redmond, Washington, or Netscape Navigator available from various sources including iPlanet, now a division of Sun Microsystems, Inc., of Palo Alto, Calif. In one embodiment, the signed applet may accept certificates such as those provided by the Internet explorer and/or the Netscape navigator.

The object 202, in an embodiment, may request performance of a task by, for example, the permissions manger 204. The permissions manager 204 may then determine which permissions are required to accomplish the task and/or how to get those permissions granted. The object 202 may also specify to the permissions manager 204 to invoke a method once the permissions are granted, in accordance with another embodiment of the present invention.

Hence, the object 202 does not have to know about local browser settings, for example. It is envisioned that the embodiments of the present invention are not limited to requesting permissions from a user of a browser. For example, the permissions manger 204 may be part of an applet and/or a servlet. It is envisioned that a browser specific class may be utilized to make the appropriate calls. In general, objects are defined by creating classes. The classes may act as templates that instruct a compiler on how to construct an actual object. In one embodiment, it is envisioned that if the permissions manager 204 determines that it is not running through a browser, it may make the call directly to the appropriate class. Accordingly, no other classes are bound to run in a browser (thereby providing more flexibility, for example).

The permissions manager 204 can further be coupled to an applet environment 206. In one embodiment, the applet environment 206 may be implemented as an object that is aware of the current state of the browser used (if any). The permissions manager 204, for example, may work with the applet environment 206 to determine any permissions required and/or have the required permissions granted. In another embodiment, the permissions manager 204 can interrogate a method provided by the object 202 for specific information which may assist the permissions manager 204 in requesting the appropriate permissions. The specific information may include input/output streams and/or there types. For example, a file input stream may indicate that permission may need to be requested for writing to a local file (e.g., a hard drive or other types of storage such as those discussed with respect to FIG. 1). Similarly, a network stream may indicate that the permissions manager 204 may need to request permission for network access. Alternatively, in an embodiment, the object 202 may provide such detailed information to the permissions manager 204 through, for example, a parameter list passed by the object 202.

Figure 3:
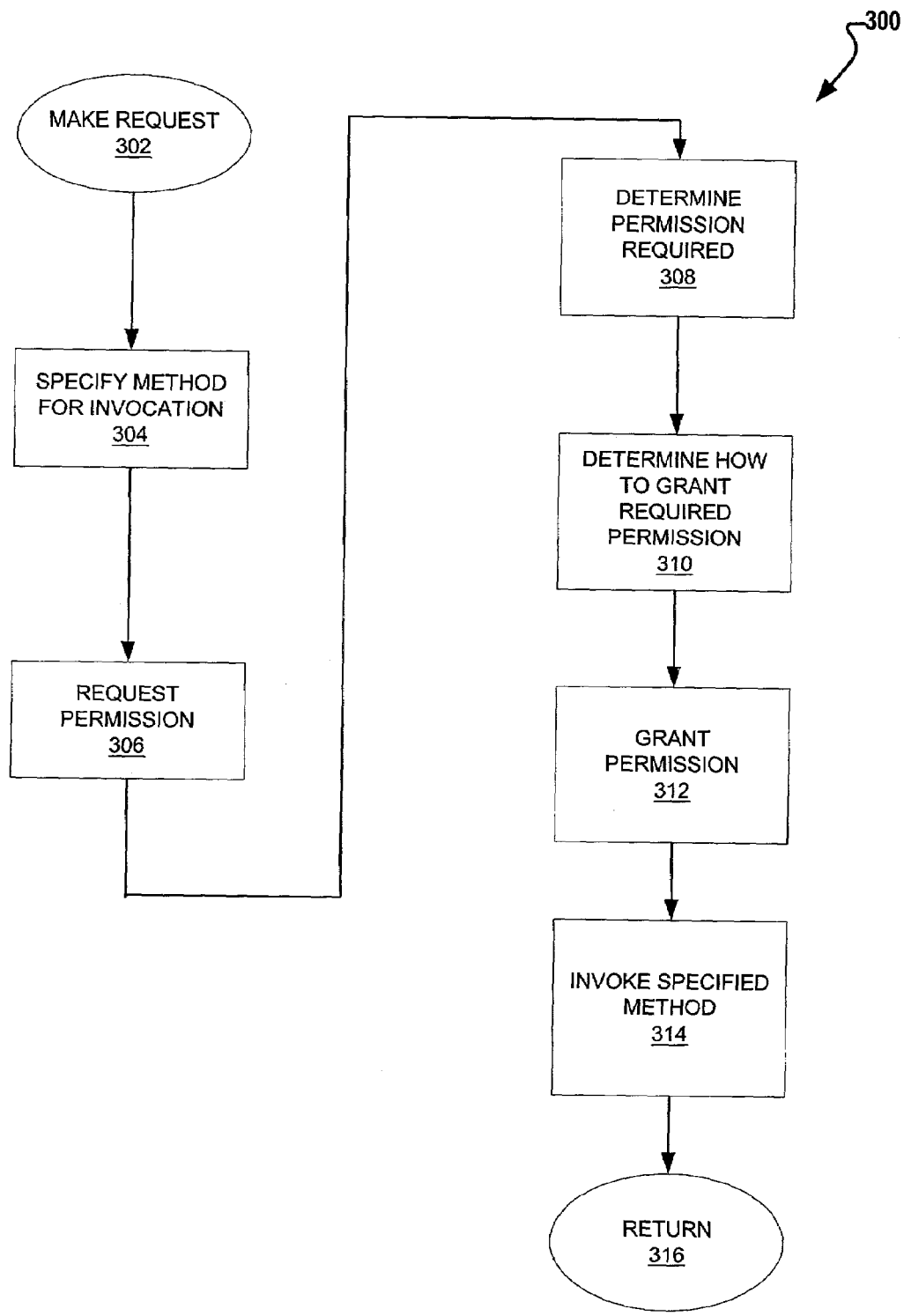
FIG. 3 illustrates an exemplarily permissions management method 300 in accordance with an embodiment of the present invention.

FIG. 3 illustrates an exemplarily permissions management method 300 in accordance with an embodiment of the present invention. The permissions management method 300 starts in a step 302, which makes a request. It is envisioned that, in an embodiment, the request of the step 302 may be made by the object 202 of FIG. 2. In a further embodiment, the request may be made for accessing a storage device. The storage device may be a local file, a corporate file system, an Internet Web server, an Oracle database, and the like. In accordance with an embodiment of the present invention, a database is envisioned to include any collection of data that is organized for collection and/or retrieval. In a step 304, a method is specified for invocation. In an embodiment, it is envisioned that the step 304 may be performed by the object 202 of FIG. 2. In a step 306, a permission is requested. The step 306 may be performed by the permissions manager 204 of FIG. 2, in an embodiment. It is also envisioned that user permissions may be different for each type of browser utilized (obtained through, e.g., a signed applet by accepting certificates). There may still need to be special requests made, for example, for operations such as reading/writing to a hard disk, reading/writing to a network, and the like.

A step 308 determines the permission(s) required, for example, for invocation of the method specified in the step 304. A step 310 determines how to grant the required permission (which is determined in the step 308). In a step 312, the required permission is granted. A step 314 invokes the specified method (from the step 304). In a step 316, the results of the request made in the steps 302 are returned to the element that invokes the step 302. It is envisioned that the steps 306, 308, 310, 312, 314, and/or 316 may be preformed by the permissions manger 204 of FIG. 2 in various embodiments.

Accordingly, in one embodiment, an applet environment component is disclosed which may be a Java class that knows how to request special privileges from a browser which that applet is running in. The applet environment component determines which browser and operating system is running by, for example, examining the environment properties of the browser's Java virtual machine (JVM). In other words, the applet environment component may provide an interface which a Java class may invoke to make a privilege request. In Java, for example, the applet environment component may invoke the privilege request by utilizing the following command line:

boolean invokeprivilege (string privilege, Hashtable params, PrivilegeRequest obj)

The privilege parameter can specify the privilege to request in a browser neutral form. The params parameter can be a hash table, which includes parameters to send to the PrivilegeRequest callback. The obj parameter can be a Java object which is invoked after the privilege request has been made.

In an embodiment, the PrivilegeRequest may be another Java interface which is implemented by the class which calls the applet environment (e.g., by calling AppletEnv.invokePrivilege( )). The interface, in turn, may define the following method:

boolean privilegeCallback (Hashtable params)

Once the privilege has been granted, the applet environment may call the invokePrivilege method to call obj.privilegeCallback, which can then perform whatever operations it needs to with the extended privileges. Moreover, the object does not have live inside the applet. In one embodiment, the object may live anywhere and the permissions manager may decide whether to handle applet type permissions.

Therefore, the problems that are being solved by at least one embodiment of the present invention include: first, an object does not need to know the details associated with a special access; and, second, if the object did know the details, at every point the object needs do that act, the same segment of code needs to be duplicated for that point. The duplication of the same segment of code in various locations will pose at least three problems in itself: first, if that code needs to be changed, it involves changing every occurrence of the code (i.e., upgradeability and/or maintenance issues). Second, when one wants to do distributed processing, it is beneficial to have the code centralized. Third, the distributed coding will also enable centralize security management which will make security enforcement a lot easier. Furthermore, the duplication of the same segment of code posses a problem because those calls to request the permissions will have to be on the current call stack in Java.

In further embodiments, novel methods and apparatus are disclosed to provide a Java component which may hide from the Java class requesting the privileges the browser-specific API classes as well as specific types of browser security requests. Such an abstraction permits the Java class to be easily reused in other runtime environments.

Additionally, in another embodiment, the techniques of the present invention may be applied to sharable content object reference model (SCORM) implementations including, for example, courseware applications. In the SCORM context, the embodiments of the present invention may be utilized to save a user's progress through a course for example. This can be especially useful when a user does not have access to a learning management system (LMS). An LMS generally includes solutions for cataloging, course registration, provision of a course, tracking (for example, by managers), and accounting. Such an LMS is typically a large software system, which can easily cost over $100,000. In most cases, an LMS is too costly for one user or cannot be run locally on a client's system, which may lack the necessary local resources.

Moreover, it is envisioned that, in an embodiment, the user's progress through the course may be tracked by utilizing the content structure format (CSF) hierarchy of blocks and sharable content objects (SCOs) defining the structure of a given course in accordance with the SCORM standard. The SCORM standard is hereby incorporated herein by reference for all purposes. Further information regarding the SCORM standard may be found by reference to www.adlnet.org.

The foregoing description has been directed to specific embodiments. It will be apparent to those with ordinary skill in the art that modifications may be made to the described embodiments, with the attainment of all or some of the advantages. For example, the techniques of the present invention may be applied to computer-based and/or electronic gaming technologies. Therefore, it is the object of the appended claims to cover all such variations and modifications as come within the spirit and scope of the invention.

What is claimed is:

1. A computer-implemented method, comprising:
    receiving a request for permission at a permissions manager from a software application to access restricted elements of a programming environment in order to execute an operation of the software application;

accessing by the permissions manager the programming environment to determine a type of permission implemented by the programming environment corresponding to the request;

requesting by the permission manager the permission from the programming environment based upon the type of permission implemented by the programming environment; and granting the request for permission to the software application via the permissions manager.

2. The computer-implemented method of claim 1, further comprising:

executing the operation of the software application once the request for permission is granted; and returning a result of the execution of the operation to the software application.

3. The computer-implemented method of claim 1, wherein the programming environment is a browser.

4. The computer-implemented method of claim 1, wherein the programming environment is an operating system.

5. The computer-implemented method of claim 1, wherein determining the type of the permission comprises examining environment properties of the programming environment.

6. The computer-implemented method of claim 1, wherein the request for permission specifies a privilege to request.

7. The computer-implemented method of claim 1, wherein the software application is selected from a group comprising an applet, a servlet, a program, an object, and a procedure.

8. The computer-implemented method of claim 1, wherein the request for permission is for accessing a storage device selected from the group including a local file, a corporate file system, an Internet Web server, and an Oracle database.

9. The computer-implemented method of claim 8, wherein the accessing of the storage device is an operation selected from the group including reading and writing.

10. The computer-implemented method of claim 1, wherein the request for permission is for accessing a storage device selected from the group including a local file, a corporate file system, an Internet Web server, and an Oracle database.

11. A computer-implemented system, comprising:

a software application to send a request for permission to access restricted elements of a programming environment in order to execute an operation of the software application; and a permissions manager to receive the request for permission and to request the permission from the programming environment by determining a type of permission implemented by the programming environment corresponding to the request;

wherein the programming environment to grant the request for permission to the software application via the permissions manager.

12. The computer-implemented system of claim 11, wherein the programming environment is a browser.

13. The computer-implemented system of claim 11, wherein the programming environment is an operating system.

14. The computer-implemented system of claim 11, wherein the system determines the type of permission by examining environment properties of the programming environment.

15. The computer-implemented system of claim 11, wherein the permissions manager specifies a privilege to request.

16. The computer-implemented system of claim 15, wherein the software application uses the privilege to execute the operation of the software application.

17. The computer-implemented system of claim 11, wherein the software application is selected from a group comprising an applet, a servlet, a program, an object, and a procedure.

18. A tangible machine-readable medium, when executed by a machine, causes the machine to:

receive a request for permission at a permissions manager from a software application to access restricted elements of a programming environment in order to execute an operation of the software application;

access by the permissions manager the programming environment to determine a type of permission implemented by the programming environment corresponding to the request;

request by the permissions manager the permission from the programming environment based upon the type of permission implemented by the programming environment; and grant the request for permission to the software application via the permissions manager.

19. The tangible machine-readable medium of claim 18, further causes the machine to:

execute the operation of the software application once the request for permission is granted and;

return a result of the execution of the operation to the software application.

20. The tangible machine-readable medium of claim 18, wherein the programming environment is a browser.

21. The tangible machine-readable medium of claim 18, wherein the programming environment is an operating system.

22. The tangible machine-readable medium of claim 21, causes the machine to determine the type of the permission by examining environment properties of the programming environment.

23. The tangible machine-readable medium of claim 18, wherein the request for permission specifies a privilege to request.

24. The tangible machine-readable medium of claim 18, wherein the software application is selected from a group comprising an applet, a servlet, a program, an object, and a procedure.

25. The tangible machine-readable medium of claim 18, wherein the request for permission is for accessing a storage device selected from the group including a local file, a corporate file system, an Internet Web server, and an Oracle database.

26. The tangible machine-readable medium of claim 25, wherein the accessing of the storage device is an operation selected from the group including reading and writing.

* * * * *